(12) United States Patent
Kadam et al.

(10) Patent No.: US 11,652,349 B2
(45) Date of Patent: May 16, 2023

(54) INVERTER TERMINAL VOLTAGE ADJUSTMENT IN POWER SYSTEM

(71) Applicant: Mitsubishi Power Americas, Inc., Lake Mary, FL (US)

(72) Inventors: Rohit Shrikant Kadam, Clifton Park, NY (US); Michael Thomas Leonard, South Park, PA (US); Jovan Z. Bebic, Clifton Park, NY (US)

(73) Assignee: Mitsubishi Power Americas, Inc., Lake Mary, FL (US)

( * ) Notice: Subject to any disclaimer, the term of this patent is extended or adjusted under 35 U.S.C. 154(b) by 144 days.

(21) Appl. No.: 17/302,615

(22) Filed: May 7, 2021

(65) Prior Publication Data

US 2022/0360085 A1  Nov. 10, 2022

(51) Int. Cl.
*H02J 3/32* (2006.01)
*H02M 7/539* (2006.01)

(52) U.S. Cl.
CPC ............... *H02J 3/32* (2013.01); *H02M 7/539* (2013.01); *H02J 2203/10* (2020.01)

(58) Field of Classification Search
CPC ...... H02J 3/32; H02J 2203/20; H02J 2203/10; H02M 7/539
See application file for complete search history.

(56) References Cited

U.S. PATENT DOCUMENTS

| | | |
|---|---|---|
| 2,482,415 A | 9/1949 | Hilton et al. |
| 9,494,139 B2 | 11/2016 | Barton et al. |
| 9,588,557 B2 | 3/2017 | Wilkins et al. |
| 10,135,247 B2 | 11/2018 | Fisher et al. |
| 10,585,445 B2 | 3/2020 | Wong et al. |
| 10,591,178 B2 | 3/2020 | Wenzel et al. |

(Continued)

FOREIGN PATENT DOCUMENTS

| | | |
|---|---|---|
| CN | 106972501 B | 9/2020 |
| EP | 2482415 A1 | 8/2012 |
| WO | WO-2022235829 A2 | 11/2022 |

OTHER PUBLICATIONS

Das, Anubrata, et al., "Adaptive Reactive Power Injection by Solar PV Inverter to Minimize Tap Changes and Line Losses", 2016 National Power Systems Conference (NPSC), (2016), 6 pgs.

(Continued)

*Primary Examiner* — Harry R Behm
(74) *Attorney, Agent, or Firm* — Schwegman Lundberg & Woessner, P.A.

(57) ABSTRACT

A utility-scale energy storage and conversion system can operate two or more inverter groups such that their reactive power commands are proportional to their available reactive power range. The control system can therefore distribute the reactive power commands in proportion to the available Q range, thereby ensuring that all inverters in the utility-scale energy storage and conversion system 100 operate with the same Q "headroom". In addition, the utility-scale energy storage and conversion system can use an on-load tap changer (LTC) to adjust a terminal voltage associated with a first group of inverters and a second group of inverters. The first group of inverters can be associated with a first rating and the second group of inverters can be associated with a second rating that is greater than the first rating.

20 Claims, 4 Drawing Sheets

(56) References Cited

U.S. PATENT DOCUMENTS

| | | | | |
|---|---|---|---|---|
| 2005/0281064 | A1* | 12/2005 | Olsen | H02J 3/381 |
| | | | | 363/71 |
| 2009/0295227 | A1* | 12/2009 | Chang | H02J 3/381 |
| | | | | 307/46 |
| 2012/0033468 | A1 | 2/2012 | Folts et al. | |
| 2014/0078793 | A1 | 3/2014 | Sivakumar et al. | |
| 2016/0094034 | A1 | 3/2016 | Divan et al. | |
| 2020/0011297 | A1* | 1/2020 | Hillebrandt | F03D 7/048 |
| 2020/0409323 | A1 | 12/2020 | Spalt et al. | |
| 2021/0004036 | A1 | 1/2021 | Wong et al. | |
| 2021/0211066 | A1* | 7/2021 | Vavilpalli | H02J 3/48 |
| 2021/0296898 | A1* | 9/2021 | Padmarao | H02J 3/16 |

OTHER PUBLICATIONS

Mahmud, Nasif, et al., "Review of control strategies for voltage regulation of the smart distribution network with high penetration of renewable distributed generation", Renewable and Sustainable Energy Reviews, (2016), 14 pgs.

Malekpour, Ahmad Reza, et al., "A Dynamic Operational Scheme for Residential PV Smart Inverters", IEEE Transactions on Smart Grid, (2016), 10 pgs.

Omole, Adedamola, "Voltage Stability Impact of Grid-Tied Photovoltaic Systems Utilizing Dynamic Reactive Power Control", A dissertation submitted in partial fulfillment of the requirements for the degree of Doctor of Philosophy Department of Electrical Engineering College of Engineering University of South Florida, (Nov. 10, 2010), 169 pgs.

"International Application Serial No. PCT/US2022/027711, Invitation to Pay Additional Fees dated Dec. 27, 2022", 7 pgs.

"International Application Serial No. PCT/US2022/027711, International Search Report dated Feb. 16, 2023", 5 pgs.

"International Application Serial No. PCT/US2022/027711, Written Opinion dated Feb. 16, 2023", 5 pgs.

Brown, Douglas, "Reactive Power-Voltage Control of Inverter Based Resources", Siemens Power Technologies International, (Nov. 4, 2020), 22 pgs.

\* cited by examiner

INVERTER TERMINAL VOLTAGE ADJUSTMENT IN POWER SYSTEM

FIELD OF THE DISCLOSURE

This document relates generally to electric power generation systems and more particularly, but not limited to, regulation of power in electric power generation systems.

BACKGROUND

Conventionally, utility-scale energy storage projects are built using whole-number multiples of identical building blocks. Manufacturing economies of scale result in per-unit costs of building-blocks being inversely proportional to their size, making the projects with a few large blocks more cost-effective than those with many small blocks. However, these advantages can be quickly reset if a design must be oversized on an account of the first whole-number building-block rating multiple being significantly larger that the desired project rating. For example, if a target is to generate a rating of 9 using multiples of a block sized at 4, one must choose 3 blocks, resulting in the total rating being 12 instead of 9 and an effective cost penalty of 33.3%.

The key component determining the rating of a building block is the power electronic inverter used to interface energy storage containers (using DC), e.g., batteries, to an electric power system (using AC). Because of their functional complexity and the associated lengthy certification processes, the ratings of the inverter are inflexible. As a result, once an inverter is selected, getting cost-efficiency for the project is equivalent to maximizing the utilization of the selected inverters.

SUMMARY OF THE DISCLOSURE

This disclosure describes a utility-scale energy storage and conversion system that can operate two or more inverter groups such that their reactive power commands are proportional to their available reactive power range. The control system can therefore distribute the reactive power commands in proportion to the available Q range, thereby ensuring that all inverters in the utility-scale energy storage and conversion system 100 operate with the same Q "headroom". In addition, the utility-scale energy storage and conversion system can use an on-load tap changer (LTC) to adjust a terminal voltage associated with a first group of inverters and a second group of inverters. The first group of inverters can be associated with a first rating and the second group of inverters can be associated with a second rating that is greater than the first rating.

In some aspects, this disclosure is directed to a utility-scale energy storage and conversion system coupled to an electric network at a point of interconnect, the system comprising: a first group of batteries having a first storage capacity; a second group of batteries having a second power storage capacity different from the first storage capacity; a first group of inverters in electric communication with the first group of batteries, the first group of inverters having a first rating; and a second group of inverters in electric communication with the second group of batteries, the second group of inverters having a second rating, wherein the second rating is the same as the first rating, wherein outputs of the first group of inverters and the second group of inverters are combined and supplied to the electric network at the point of interconnect.

In some aspects, this disclosure is directed to a utility-scale energy storage and conversion system that adjusts a terminal voltage associated with a first group of inverters and a second group of inverters, wherein the first group of inverters is associated with a first rating, wherein the second group of inverters is associated with a second rating that is greater than the first rating, the utility-scale energy storage and conversion system comprising: a control circuit to: determine, using a representation of a first available reactive power value associated with the first group of inverters and a representation of a second available reactive power value associated with the second group of inverters, a representation of a total available reactive power; generate, using the representation of the first available reactive power value and a representation of a total required reactive power value, a first control signal representing a first desired reactive power value proportional to the first available reactive power value; and generate, using the representation of the second available reactive power value and the total required reactive power value, a second control signal representing a second desired reactive power value proportional to the second available reactive power value.

In some aspects, this disclosure is directed to a utility-scale energy storage and conversion system to use an on-load tap changer (LTC) to adjust a terminal voltage associated with a first group of inverters and a second group of inverters, wherein the first group of inverters is associated with a first rating, wherein the second group of inverters is associated with a second rating that is greater than the first rating, the utility-scale energy storage and conversion system comprising: a control circuit to: determine, using a representation of a measured current and a representation of a measured voltage at a transformer winding of a transformer in the system, the terminal voltage associated with the first group of inverters and the second group of inverters; determine, using a representation of a total required reactive power value, a target terminal voltage associated with the first group of inverters and the second group of inverters; and generate, using a difference between the terminal voltage and the target terminal voltage, a tap setting on the LTC so that the terminal voltage associated with the first group of inverters and the second group of inverters adjusts accordingly.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The primary function of utility-scale energy storage installations is to exchange active power with the power system for purposes of maintaining system frequency or arbitraging energy. In addition to this primary function, utility-scale energy storage installations are also required to maintain electrical conditions at the point of interconnect (POI) within an operating range. Most commonly this requires maintaining the POI voltage, which in turn requires supplying reactive power to the system. Reactive power can be supplied from dedicated sources, such as switched capacitors, or from the inverters already utilized to provide the primary function of interfacing energy storage elements (outputting DC voltage), to an AC system.

The present inventors have recognized an opportunity to minimize installation complexity and, consequently, cost by meeting both the primary function of utility-scale energy storage installations and the need to maintain electrical conditions at the POI from the inverters used to interface energy storage elements. The cost is further reduced by controlling the system in a way that considers available reactive range of inverters given their primary function of power delivery and by keeping the inverters at their maximum effective ratings by controlling their terminal voltage using an on-load tap changer (LTC).

As described in more detail below, various techniques of this disclosure can also leverage an on-load tap changer (LTC) to control dynamic reactive power from the battery inverters to meet the voltage requirements at the POI. For each LTC operation, the inverter's real power (P) and reactive power (Q) outputs are re-adjusted to try to maintain the POI voltage at a value of interest. For calculations of the corner points of capability, the final tap position of the LTC can be held, and the Q outputs of the inverters can be changed until both inverters reach the current limit. Using the LTCs to control the inverters' terminal voltages can help ensure that the grid voltage does not affect the dynamic reactive range of the plant. Also, using a "directionally sensitive setpoint" can help to ensure that the battery inverters can stay within the allowed terminal voltage range during sudden changes in reactive output.

Figure 1:
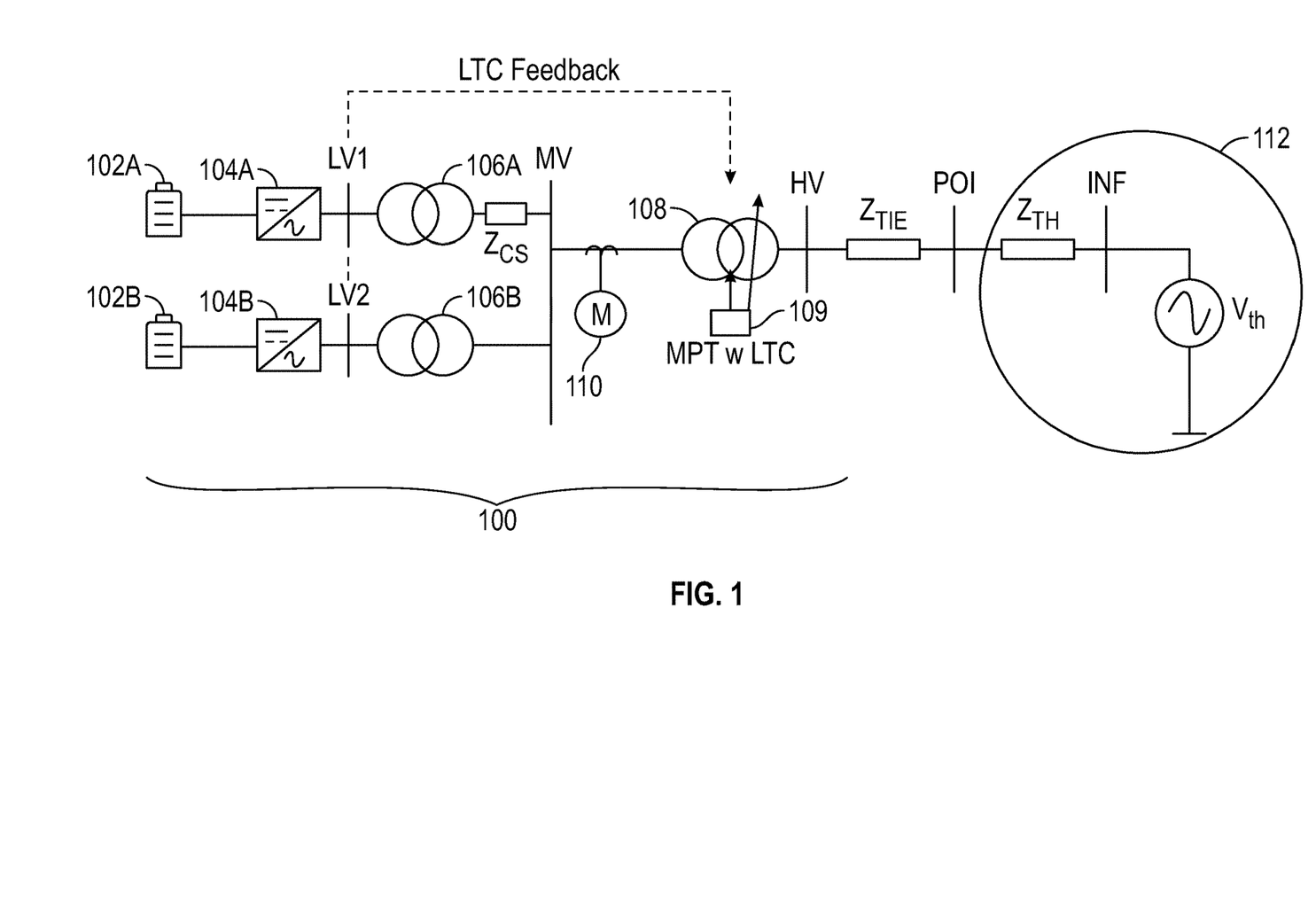
FIG. 1 is a one-line diagram of an example of a utility-scale energy storage and conversion system that can implement various techniques of this disclosure.

FIG. 1 is a one-line diagram of an example of a utility-scale energy storage and conversion system that can implement various techniques of this disclosure. The utility-scale energy storage and conversion system 100 can include a first group of batteries 102A and a second group of batteries 102B. The first group of batteries 102A can have a first storage capacity and the second group of batteries having a second power storage capacity different from the first storage capacity, such as greater than the first power storage capacity.

The system 100 can include a first group of inverters 104A in electric communication with the first group of batteries 102A and a second group of inverters 104B in electric communication with the second group of batteries 102B. In some examples, the first group of inverters 104A can include a first number of inverters, and the second group of inverters can include a second number of inverters different than the first number. The battery and inverter combinations can help regulate the frequency at the point of interconnect.

Because the first group of inverters 104A is associated with the first group of batteries 102A, the first group of inverters 104A can be associated with a first rating. Similarly, because the second group of inverters 104B is associated with the second group of batteries 102B, the second group of inverters 104A can be associated with a second rating that is different than the first rating, such as greater than the first rating.

In some examples, the inverters in each of the two groups 104A, 104B can have the same rating. In one non-limiting example, individual ones of the inverters in the two groups 104A, 104B can have identical ratings. In another non-limiting example, individual ones of the inverters in the two groups 104A, 104B can have different ratings, but the groups 104A, 104B can have the same rating. Likewise, in some examples, each group 104A, 104B can have the same number of inverters within each group 104A, 104B. However, because the first group of inverters 104A is associated with a first group of batteries 102A that has a different energy storage capacity than the second group of batteries 102B associated with the second group of inverters 104B, the inverter/battery pairings can be considered to be non-homogeneous.

The second group of inverters 104B can output more power because they are associated with the second group of batteries 102B, which can have a higher energy storage capacity then the first group of batteries 102A. However, the second group of inverters 104B can have less reactive power range than the first group of inverters 104A.

The first group of inverters 104A can be coupled with a first voltage bus LV1, e.g., a low-voltage bus at 400-500 volts (V), and the second group of inverters 104B can be coupled with a second voltage bus LV2, e.g., a low-voltage bus at 400-500 V. The voltage of the first voltage bus LV1 can be increased using groups of step-up transformers 106A, e.g., pad-mount transformers, that are coupled with a medium-voltage bus MV, e.g., 34.5 kilovolts (kV). Similarly, the voltage of the second voltage bus LV2 can be increased using groups of step-up transformers 106B, e.g., pad-mount transformers, that are coupled with the medium-voltage bus MV. The impedance of MV cables coupling the groups of step-up transformers 106A to the MV bus is represented by impedance $Z_{CS}$. The group of step-up transformers 106B will be similarly coupled to the medium-voltage bus MV via cabling having an associated impedance $Z_{CS}$.

The voltage of the medium-voltage bus MV can be increased using another step-up transformer, namely main power transformer (MPT) 108. The MPT 108 can increase the voltage to a transmission voltage, such as 138 kV, at the high-voltage bus HV. The MPT 108 can include an on-load tap changer (LTC) 109 coupled with taps on a high-voltage winding of the MPT 108. The LTC can adjust the number of turns on the high-voltage winding, which can change the turns ratio of MPT 108 and thus adjust the output voltage of the transformer. In some examples, the turns ratio of the MPT 108 can be adjustable in a +/−10% range in 16 steps in each direction. One or more meters 110, such as current and/or voltage meters, can be coupled to the low side of the MPT 108 to monitor conditions.

The utility-scale energy storage and conversion system 100 can be coupled with an electric network 112, which is represented by a Thevenin equivalent voltage VTH at an infinite bus INF. The utility-scale energy storage and conversion system 100 can form part of a first electric network and the electric network 112 can be considered a second electric network.

The coupling of the electric network 112 with the utility-scale energy storage and conversion system 100 at a point of interconnect (POI) is represented by a Thevenin equivalent impedance $Z_{TH}$. The electrical connection between the high-voltage bus HV of the utility-scale energy storage and conversion system 100 and the POI is represented by an impedance $Z_{TIE}$. In FIG. 1, the outputs of the first group of inverters 104A and the outputs of the second group of inverters 104B are combined at the MV bus and supplied to the electric network 112 at the POI.

This disclosure describes, among other things, two aspects of the utility-scale energy storage and conversion system 100: 1) a non-homogeneous design of the system 100, and 2) an adaptive voltage management technique to increase effective inverters' ratings.

The non-homogeneous design of the system 100 divides the inverters into multiple groups with differently rated energy storage capacity within each group. As mentioned above, the two inverter groups 104A, 104B are associated with groups of batteries 102A, 102B, respectively. Assume that the first group of batteries 102A has the greater energy storage capacity than the second group of batteries 102B. To charge (or discharge) the two groups at the same relative pace, the first group of inverters 104A must run at a higher active power than the second group of inverters 104B. This uneven active power dispatch leaves the second inverter group 104B with the greater available reactive range than the first group of inverters 104A. So, to fully utilize its inverters' ratings, the second group of inverters 104B is given the higher reactive power command than the first group of inverters 104A.

Using various techniques of this disclosure, the utility-scale energy storage and conversion system 100 can operate both inverter groups 104A, 104B such that their reactive power commands are proportional to their available reactive power range. By way of a non-limiting example, an inverter with the apparent power (S) ratings of 2,500 kVA that is given a 2,250 kW active power (P) command, has the available reactive (Q) range of ~1,090 kVAr (kVA rating is an orthogonal sum of active and reactive power). The same inverter operating at a 2,125 kW P command (a ~5.5% reduction in P) has the available reactive range of ~1,317 kVA (a ~21% increase in Q). The control system can therefore distribute the reactive power commands in proportion to the available Q range, thereby ensuring that all inverters in the utility-scale energy storage and conversion system 100 operate with the same Q "headroom".

Figure 2:
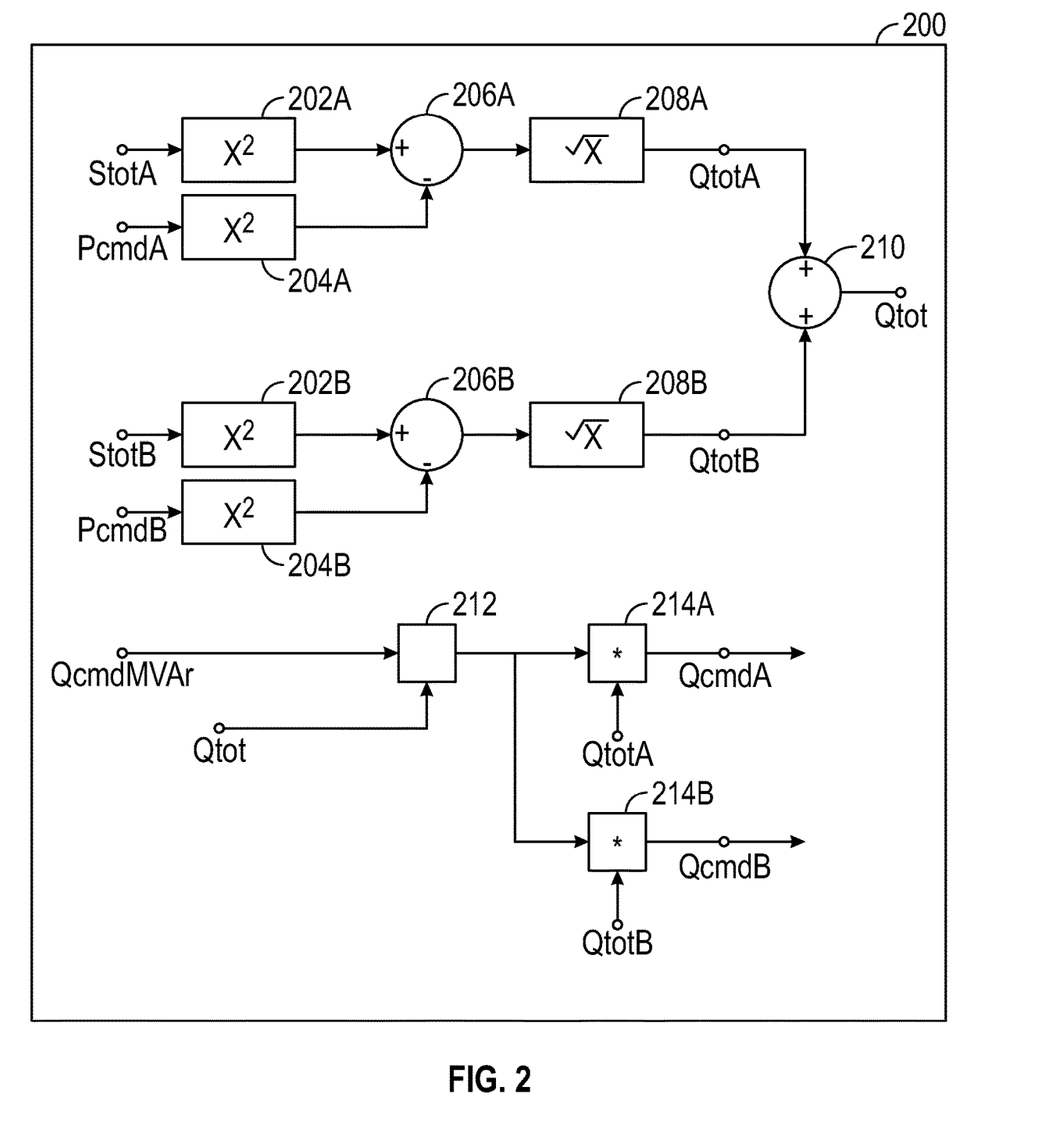
FIG. 2 is a conceptual diagram of an example of a control circuit that can implement various techniques of this disclosure.

FIG. 2 is a conceptual diagram of an example of a control circuit that can implement various techniques of this disclosure. In some examples, the control circuit 200 of FIG. 2 can form part of or be in communication with a plant controller for the utility-scale energy storage and conversion system 100 of FIG. 1. The control circuit 200 can operate non-homogeneous inverter groups, such as the inverter groups 104A, 104B of FIG. 1, such that their reactive power commands are proportional to their available reactive power range. The control circuit 200 can include, form part of, or be coupled with a processor that can execute instructions to perform the various functions described in this disclosure.

The control circuit 200 can receive a signal StotA representing an available apparent power value StotA associated with the first group of inverters 104A of FIG. 1 and a signal StotB representing an available apparent power associated with the second group of inverters 104B of FIG. 1. The control circuit 200 can receive a signal PcmdA representing a required active power value associated with the first group of inverters 104A of FIG. 1 and a signal PcmdB representing a required active power command associated with the second group of inverters 104B of FIG. 1.

Using the relationship $[\text{Apparent power (S)}]^2 = [\text{Real Power (P)}]^2 + [\text{Reactive Power (Q)}]^2$, the control circuit 200 can determine a representation of a total available reactive power Qtot. More particularly, at block 202A, the control circuit 200 can perform the mathematical operation of squaring the total available apparent power StotA associated with the first group of inverters 104A of FIG. 1. At block 204A, the control circuit 200 can perform the mathematical operation of squaring the active power command PcmdA associated with the first group of inverters 104A of FIG. 1. At block 206A, the control circuit 200 can subtract the square from block 204A from the block 202A. At block 208A, the control circuit 200 can perform the mathematical operation of determining the square root of the sum and determine QtotA, which is a representation of the available reactive power associated with the first group of inverters 104A of FIG. 1.

Similarly, at block 202B, the control circuit can perform the mathematical operation of squaring the total available apparent power StotB associated with the second group of inverters 104B of FIG. 1. At block 204B, the control circuit can square the active power command PcmdB associated with the second group of inverters 104B of FIG. 1. At block 206B, the control circuit 200 can subtract the square from block 204B from the block 202B. At block 208B, the control circuit 200 can perform the mathematical operation of determining the square root of the sum and determine QtotB, which is a representation of the available reactive power associated with the second group of inverters 104B of FIG. 1. At block 210, the control circuit 200 can determine, such as by summing QtotA and QtotB, a representation of a total available reactive power Qtot for the two groups of inverters 104A, 104B of FIG. 1.

Then, the control circuit 200 can use QtotA and QtotB to prorate the total required reactive power value, which is represented by the signal QcmdMVAr, into desired reactive power values, represented by control signals QcmdA and QcmdB. For example, at block 212, the control circuit 200 can perform the mathematical operation of division of the value represented by the signal QcmdMVAr, which represents the total required reactive power value demanded by the system operator as being required at the POI, by the total available reactive power Qtot. That is, the total required reactive power value QcmdMVAr can represent an amount of desired reactive power at the point of interconnect between the utility-scale energy storage and conversion system 100 and another electric network 112.

At block 214A, the control circuit 200 can perform the mathematical operation of multiplication on the result of block 212 with QtotA, which is the representation of the available reactive power associated with the first group of inverters 104A of FIG. 1, to generate a control signal QcmdA that represents a desired reactive power value proportional to the available reactive power value QtotA.

Similarly, at block 214B, the control circuit 200 can perform the mathematical operation of multiplication on the result of block 212 with QtotB, which is the representation of the available reactive power associated with the second group of inverters 104B of FIG. 1, to generate a control signal QcmdB that represents a desired reactive power value proportional to the available reactive power value QtotB.

The control circuit 200 can output the two control signals QcmdA, QcmdB to the inverter groups 104A, 104B. Using the two control signals QcmdA, QcmdB, the utility-scale energy storage and conversion system 100 can adjust a terminal voltage associated with the first group of inverters 104A and the second group of inverters 104B. Thus, using various techniques of this disclosure, the total required reactive power value demanded by the system operator as being required at the POI (represented by the signal QcmdMVAr) can be assigned to the two groups of inverters 104A, 104B in proportion to the available reactive power value Qtot to give each group of inverters the same reactive power Q "headroom". In addition, these techniques can maximize inverter utilization by providing reactive power to the POI by fully utilizing the available apparent values StotA, StotB of the inverter groups 104A, 104B.

It should be noted that although FIG. 1 depicts two groups of inverters and FIG. 2 is described with respect to the two groups of inverters of FIG. 1, the disclosure is not limited to two groups of inverters. Rather, the total required reactive power value demanded by the system operator as being required at the POI can be assigned to more than two groups of inverters in proportion to the available reactive power value.

By using the non-homogeneous plant design techniques described above with respect to FIG. 2, for example, the utility-scale energy storage and conversion system 100 can operate both inverter groups 104A, 104B such that their reactive power Q commands are proportional to their available reactive power range. As such, the control circuit 200 can dispatch active power commands to the inverter groups 104A, 104B so as to match their different associated energy storage capabilities, namely those associated with the groups of batteries 102A, 102B. These techniques allow the groups of batteries 102A, 102B to be charged/discharged relative to their energy storage ratings and not relative to what the capabilities of the inverter groups 104A, 104B, which can allow the groups of batteries 102A, 102B to discharge at the same rate, for example. Charging and/or discharging batteries of different energy storage capacity at corresponding and proportional rates provides enhanced battery balancing and optimized total duration of active and reactive power control.

As mentioned above, in addition to the techniques described above in which the total required reactive power value demanded by the system operator as being required at the POI can be assigned to two (or more) groups of inverters in proportion to the available reactive power value, this disclosure describes adaptive voltage management techniques to increase inverters' ratings. The adaptive voltage management techniques described in this disclosure can increase the "effective" inverter ratings by adjusting the turns ratio on a main power transformer, e.g., MPT 108 of FIG. 1, such as to increase the voltage at the inverters' terminals, such as the terminals of the inverters in the groups of inverters 104A, 104B of FIG. 1.

An increase in ratings can be achieved by increasing the voltage, which results in a proportional increase in the inverter's apparent power capability. Continuing with the example from above, increasing the terminal voltage of an inverter rated 2,500 kVA to 1.03 per unit (pu), can result in an effective apparent power capability of 2,575 kVA. Thus, an inverter that operates at 2,250 kW of active power can now reach 1,252 kVAr, which is a 14.8% increase relative to the Q range it had at a 1.0 pu voltage. In other words, an increase in the terminal voltage of an inverter can result in a free increase in reactive power Q.

Conventionally, a turns ratio on the main power transformer (MPT), such as the MPT 108 of FIG. 1, is controlled to maintain a constant voltage level at the medium-voltage (MV) bus. The transmission system voltage, e.g., at the HV bus, can change with the prevailing system conditions, and having a degree of freedom to regulate the voltage profile within the system 100 can help ensure that the plant's capabilities are independent of the conditions of the electric network 112. This can be important for meeting grid-code requirements that, among many things, stipulate an operating range for the system 100 reactive power output as a function of voltage at the POI and for the permitted range of power export and import (discharging and charging energy storage, respectively).

A shortcoming of the conventional design is that it can allow the inverters' terminal voltage to be dependent on the voltage drops across the pad-mount transformers, which can vary with operating conditions. Controlling the inverters' terminal voltage can explicitly ensure that the inverters have an apparent power (kVA) capability independent of either the power system voltage or the energy storage plant's, e.g., system 100, operating conditions and that the maximum kVA capability is available in all operating conditions.

In accordance with various techniques of this disclosure, a utility-scale energy storage and conversion system, such as the utility-scale energy storage and conversion system 100 of FIG. 1, can use an on-load tap changer (LTC), such as the LTC 109 of FIG. 1, to adjust a terminal voltage associated with a first group of inverters, e.g., the first group of inverters 104A in FIG. 1, and a second group of inverters, e.g., the second group of inverters 104B in FIG. 1. The first group of inverters can be associated with a first rating and the second group of inverters can be associated with a second rating that is greater than the first rating.

Figure 3:
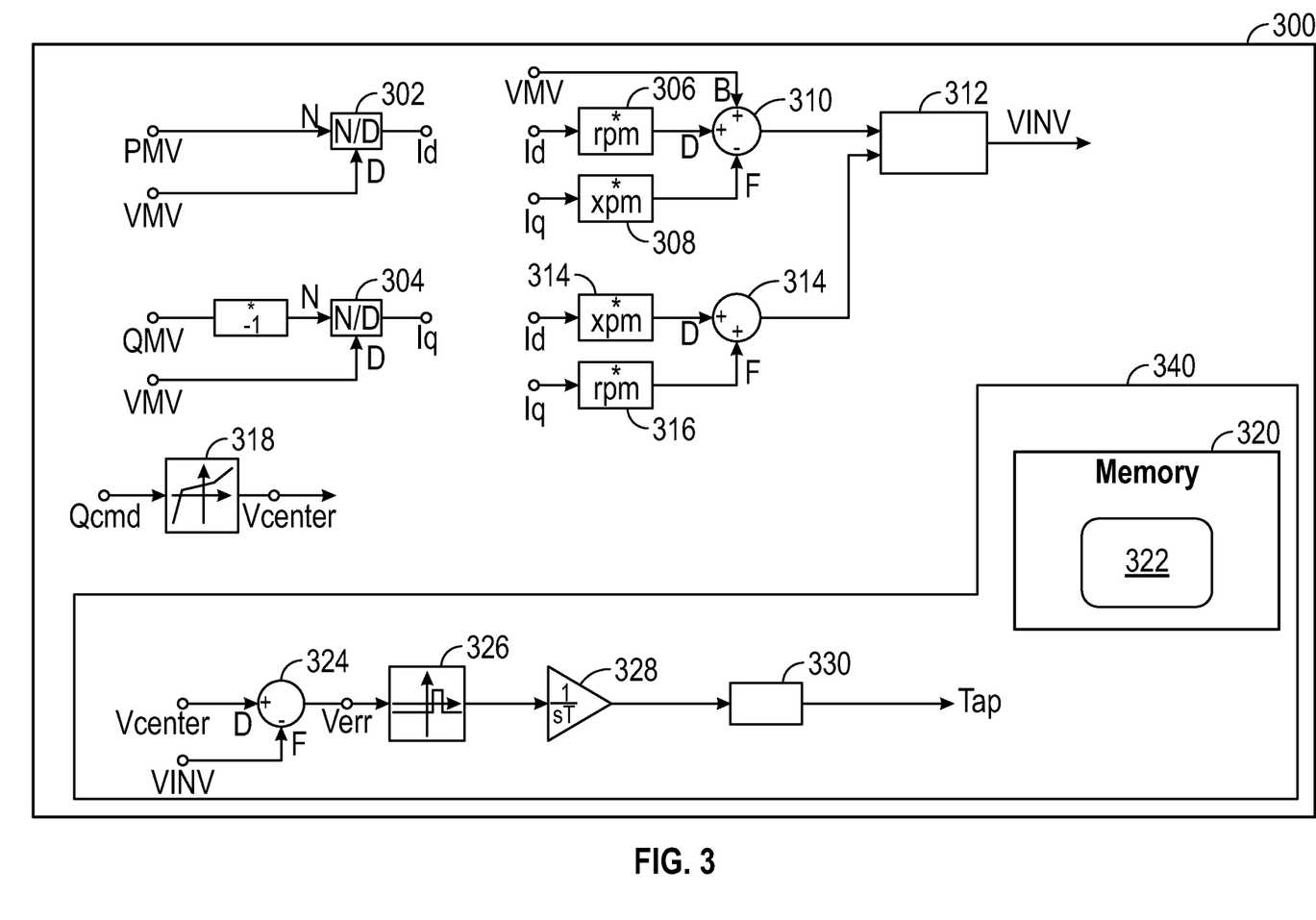
FIG. 3 is a conceptual diagram of an example of a control circuit that can implement various techniques of this disclosure.

FIG. 3 is a conceptual diagram of an example of a control circuit that can implement various techniques of this disclosure. In some examples, the control circuit 300 of FIG. 3 can form part of or be in communication with a plant controller for the utility-scale energy storage and conversion system 100 of FIG. 1. The control circuit 300 can operate an LTC, such as the LTC 109 of FIG. 1, to adjust a terminal voltage associated with a first group of inverters, e.g., the first group of inverters 104A in FIG. 1, and a second group of inverters, e.g., the second group of inverters 104B in FIG. 1. In some examples, the control circuit 300 of FIG. 3 and the control circuit 200 of FIG. 2 can be the same control circuit or be in communication with one another. The control circuit 300 can include, form part of, or be coupled with a processor that can execute instructions to perform the various functions described in this disclosure.

The control circuit 300 can receive several signals, including PMV, VMV, and QMV. The signal PMV can represent the measured active power to the medium voltage winding of the MPT 108 of FIG. 1, such as on a per unit basis. The signal QMV can represent the measured reactive power to the medium voltage winding of the MPT 108 of FIG. 1, such as on a per unit basis. The signal VMV can represent the measured voltage magnitude at a transformer winding of a transformer, such as the winding of the MPT 108 in FIG. 1 coupled with the MV bus, such as on a per unit basis.

At block 302, the control circuit 300 can perform the mathematical operation of division of PMV by VMV to determine a representation of a measured real current Id. Similarly, at block 304, the control circuit 300 can perform the mathematical operation of division of QMV by VMV to determine a representation of a measured reactive current Iq.

Next, the control circuit 300 can determine a terminal voltage VINV associated with a first group of inverters and a second group of inverters, such as the inverter groups 104A, 104B in FIG. 1, using a representation of a measured current and a representation of a measured voltage at a transformer winding of a transformer. In some examples, the representation of the measured current and the representation of the measured voltage are measured at a low side of the main power transformer MPT 108 of FIG. 1.

At block 306, the control circuit 300 can perform the mathematical operation of multiplication of the determined real current Id and the resistance of the step-up transformer 106A of FIG. 1. At block 308, the control circuit 300 can perform the mathematical operation of multiplication of the determined reactive current Iq and the reactance of the step-up transformer 106A of FIG. 1. At block 310, the control circuit 300 can sum the results of the two multiplications with the signal VMV and output the result to block 312.

At block 314, the control circuit 300 can perform the mathematical operation of multiplication of the determined real current Id and the reactance of the step-up transformer 106A of FIG. 1. At block 316, the control circuit 300 can perform the mathematical operation of multiplication of the determined reactive current Iq and the resistance of the step-up transformer 106A of FIG. 1. At block 314, the control circuit 300 can sum the results of the multiplications and output the result to block 312. At block 312, the control circuit 300 can determine the terminal voltage VINV, where the terminal voltage VINV is given by Equation 1 below:

$$VINV = VMV + (R+jX)*IMV \quad \text{Equation 1}$$

where IMV=conj(Pcmd+jQcmd)/VMV, where VMV has an assumed phasor angle of zero, where the value of Pcmd represents a required active power value, and where the value of Qcmd represents the total required reactive power value (similar to QcmdMVAr).

Next, at block 318, the control circuit 300 can determine, using the representation of the total required reactive power value Qcmd, a target terminal voltage Vcenter associated with the first group of inverters and the second group of inverters, such as the first group of inverters 104A and the second group of inverters 104B in FIG. 1. The target terminal voltage Vcenter is the desired voltage at the terminals of the first group of inverters 104A and the second group of inverters 104B in FIG. 1.

Figure 4:
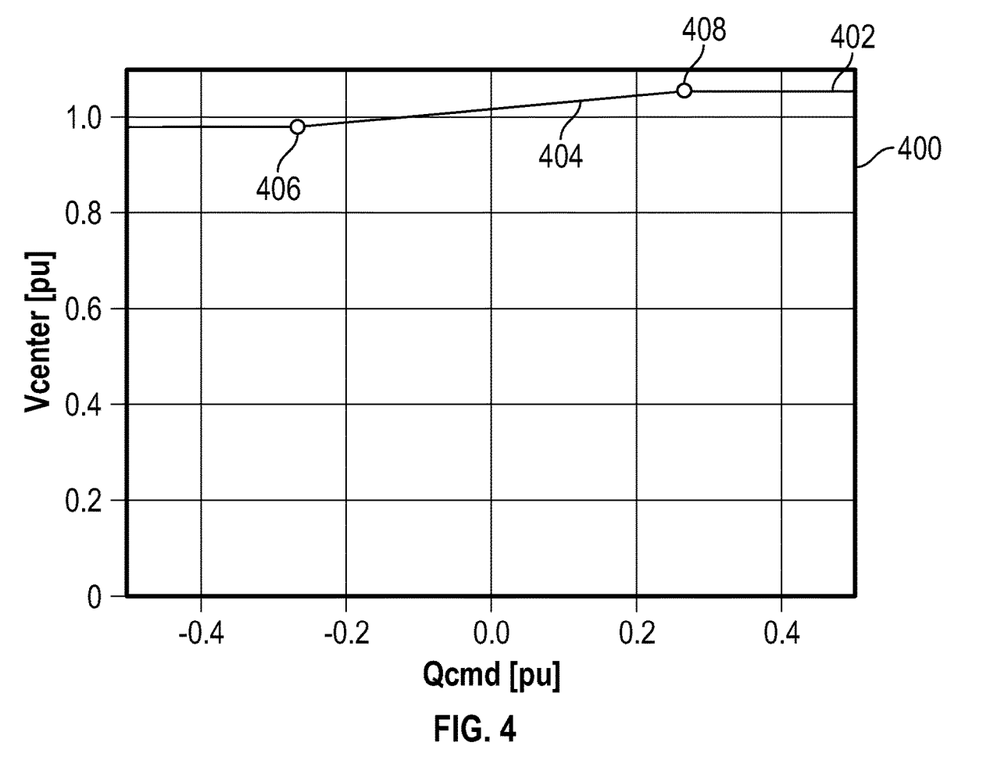
FIG. 4 is a graph of an example of a transfer function that relates a total required reactive power value and a target terminal voltage.

In some examples, at block 318, the control circuit 300 can implement a transfer function, such as stored in a memory device 320, that relates the total required reactive power value Qcmd and the target terminal voltage Vcenter to determine the target terminal voltage Vcenter. The memory device 320 can form part of or be in communication with the control circuit 300. At least a portion of the transfer function can include a linear relationship between the total required reactive power value Qcmd and the target terminal voltage Vcenter, such as shown in FIG. 4. In some examples, the control circuit 300 can determine the transfer function using a data set 322 stored in the memory device 320. In some examples, the data set 322 can be stored as a lookup table.

Next, in some non-limiting examples, the control circuit 300 can generate, using a difference between the terminal voltage VINV and the target terminal voltage Vcenter, a tap setting Tap on the LTC to adjust the terminal voltage associated with the first group of inverters and the second group of inverters accordingly. The values of Vcenter and VINV can be delivered to an LTC controller 340 to adjust the tap position on the MPT. In some examples, the LTC controller can be a commercial off-the-shelf unit working in a manner described in reference to blocks 320 to 330. At block 324, the control circuit 300 can perform a mathematical operation, such as subtraction, to determine a difference Verr between the terminal voltage VINV and the target terminal voltage Vcenter. At block 326, the control circuit 300 can perform a thresholding operation to determine whether to adjust the tap setting. For example, if Verr is greater than a first threshold value, the control circuit 300 can adjust the tap setting upward, if Verr is less than a second threshold value, the control circuit 300 can adjust the tap setting downward, and if Verr is between the first and second thresholds, then the control circuit 300 does not adjust the tap setting.

In some examples, at block 328, the control circuit 300 can perform the mathematical operation of integration. Integration can be used to implement LTC up/down counting. The integrator output of block 328 can be converted to a nearest integer value at block 330 to model a discrete tap position in the LTC, resulting in a tap setting Tap on the LTC, such as the LTC 109 of FIG. 1.

In this manner, the control circuit 300 can use the LTC to control the voltage at the output terminals of the inverters, which can control the voltage at the POI. Using these techniques, the control circuit 300 can adjust the voltage at the MV bus in FIG. 1 to help ensure that the desired real and reactive power is available at the POI. These techniques are invariant to grid variations at the POI.

It should be noted that by using these techniques, the LTC, such as the LTC 109 of FIG. 1, can determine what the voltage magnitude should be on the LV bus and can control those voltages indirectly, rather than only considering the voltage magnitude on the MV bus to which the LTC is coupled. Then, the LTC can control a regulated voltage profile, such as the real power P and the reactive power Q, at the LV bus. As such, the adaptive voltage management techniques of this disclosure allow the LTC to control a remote bus, such as LV1 and LV2 in FIG. 1.

FIG. 4 is a graph of an example of a transfer function that relates a total required reactive power value Qcmd and a target terminal voltage Vcenter. The x-axis of the graph 400 represents the total required reactive power value Qcmd on a per unit basis, and the y-axis represents the target terminal voltage Vcenter on a per unit basis. In some examples, the transfer function 402 can include at least one linear region 404, such as between points 406, 408. The transfer function 402 is not limited to linear relationships and can include a second or higher order relationship between the total required reactive power value Qcmd and the target terminal voltage Vcenter. In other examples, the transfer function 402 can utilize the required active power value Pcmd input in addition to the total required reactive power value Qcmd to generate the target terminal voltage Vcenter.

Various Notes

Each of the non-limiting aspects or examples described herein may stand on its own or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The claimed invention is:

1. A utility-scale energy storage and conversion system coupled to an electric network at a point of interconnect, the system comprising:
   a first group of batteries having a first storage capacity;
   a second group of batteries having a second power storage capacity different from the first storage capacity;
   a first group of inverters in electric communication with the first group of batteries, the first group of inverters having a first rating; and
   a second group of inverters in electric communication with the second group of batteries, the second group of inverters having a second rating, wherein the second rating is the same as the first rating,
   wherein outputs of the first group of inverters and the second group of inverters are combined and supplied to the electric network at the point of interconnect; and
   a control circuit configured to:
      distribute reactive power commands to the first and second groups of inverters to allocate reactive power proportional to corresponding available reactive powers of the first and second groups of inverters so as to utilize their corresponding ratings.

2. The utility-scale energy storage and conversion system of claim 1, wherein the first group of inverters includes a first number of inverters, and wherein the second group of inverters includes a second number of inverters different than the first number of inverters.

3. The utility-scale energy storage and conversion system of claim 1, wherein the control circuit configured to distribute reactive power commands to the first and second groups of inverters to allocate reactive power proportional to corresponding available reactive powers of the first and second groups of inverters so as to utilize their corresponding ratings is configured to:
   determine, using a representation of a first available reactive power value associated with the first group of inverters and a representation of a second available reactive power value associated with the second group of inverters, a representation of a total available reactive power;
   generate, using the representation of the first available reactive power value and a representation of a total required reactive power value, a first control signal representing a first desired reactive power value proportional to the first available reactive power value; and
   generate, using the representation of the second available reactive power value and the total required reactive power value, a second control signal representing a second desired reactive power value proportional to the second available reactive power value.

4. The utility-scale energy storage and conversion system of claim 3, the control circuit further configured to:
   determine, using a representation of a first available apparent power value and a representation of a first required active power value, the first available reactive power value, wherein the first available apparent power value and the first required active power value are associated with the first group of inverters; and
   determine, using a representation of a second available apparent power value and a representation of a second required active power value, the second available reactive power value, wherein the second available apparent power value and the second required active power value are associated with the second group of inverters.

5. The utility-scale energy storage and conversion system of claim 3, wherein the total required reactive power value represents an amount of desired reactive power at the point of interconnect.

6. The utility-scale energy storage and conversion system of claim 1, wherein the first group of inverters are coupled with a first voltage bus, wherein the second group of inverters are coupled with a second voltage bus, wherein the first voltage bus and the second voltage bus are coupled with a third voltage bus through corresponding first step-up transformers, wherein the third voltage bus is coupled with a fourth voltage bus through a second step-up transformer, wherein the fourth voltage bus of the electric network is coupled with the point of interconnect, wherein voltages of the first voltage bus and the second voltage bus are less than a voltage of the third voltage bus, and wherein the voltage of the third voltage bus is less than a voltage of the fourth voltage bus.

7. The utility-scale energy storage and conversion system of claim 1, comprising:
an on-load tap changer to adjust a terminal voltage associated with the first group of inverters and the second group of inverters in an electric network.

8. The utility-scale energy storage and conversion system of claim 7, wherein the control circuit is further configured to:
determine, using a representation of a measured current and a representation of a measured voltage at a transformer winding of a transformer in the electric network, the terminal voltage associated with the first group of inverters and the second group of inverters;
determine, using a representation of a total required reactive power value, a target terminal voltage associated with the first group of inverters and the second group of inverters; and
generate, using a difference between the terminal voltage and the target terminal voltage, a tap setting on the on-load tap changer so that the terminal voltage associated with the first group of inverters and the second group of inverters adjusts accordingly.

9. The utility-scale energy storage and conversion system of claim 8, wherein the first group of inverters are coupled with a first voltage bus, wherein the second group of inverters are coupled with a second voltage bus, wherein the first voltage bus and the second voltage bus are coupled with a third voltage bus through corresponding first step-up transformers, wherein the third voltage bus is coupled with a fourth voltage bus through a second step-up transformer, wherein the fourth voltage bus of the electric network is coupled with a point of interconnect coupled with another electric network, wherein voltages of the first voltage bus and the second voltage bus are less than a voltage of the third voltage bus, wherein the voltage of the third voltage bus is less than a voltage of the fourth voltage bus, wherein the transformer is the second step-up transformer, and wherein the representation of the measured current and the representation of the measured voltage are measured at a low-side of the second step-up transformer.

10. The utility-scale energy storage and conversion system of claim 8, wherein the control circuit configured to determine, using the representation of the total required reactive power value, the target terminal voltage associated with the first group of inverters and the second group of inverters is further configured to:
determine the target terminal voltage using a transfer function that relates the total required reactive power value and the target terminal voltage.

11. The utility-scale energy storage and conversion system of claim 10, wherein at least a portion of the transfer function includes a linear relationship between the total required reactive power value and the target terminal voltage.

12. The utility-scale energy storage and conversion system of claim 10, wherein the control circuit configured to determine the target terminal voltage using the transfer function that relates the total required reactive power value and the target terminal voltage is configured to:
determine the target terminal voltage using a stored data set.

13. The utility-scale energy storage and conversion system of claim 12, wherein the stored data set is a lookup table.

14. A utility-scale energy storage and conversion system coupled to an electric network at a point of interconnect, the system comprising:
a first group of batteries having a first storage capacity;
a second group of batteries having a second power storage capacity different from the first storage capacity;
a first group of inverters in electric communication with the first group of batteries, the first group of inverters having a first rating; and
a second group of inverters in electric communication with the second group of batteries, the second group of inverters having a second rating, wherein the second rating is the same as the first rating,
wherein outputs of the first group of inverters and the second group of inverters are combined and supplied to the electric network at the point of interconnect; and
a control circuit to:
determine, using a representation of a first available reactive power value associated with the first group of inverters and a representation of a second available reactive power value associated with the second group of inverters, a representation of a total available reactive power;
generate, using the representation of the first available reactive power value and a representation of a total required reactive power value, a first control signal representing a first desired reactive power value proportional to the first available reactive power value; and
generate, using the representation of the second available reactive power value and the total required reactive power value, a second control signal representing a second desired reactive power value proportional to the second available reactive power value.

15. The utility-scale energy storage and conversion system of claim 14, wherein the first group of inverters includes a first number of inverters, and wherein the second group of inverters includes a second number of inverters different than the first number of inverters.

16. The utility-scale energy storage and conversion system of claim 14, the control circuit to:
determine, using a representation of a first available apparent power value and a representation of a first required active power value, the first available reactive power value, wherein the first available apparent power value and the first required active power value are associated with the first group of inverters; and
determine, using a representation of a second available apparent power value and a representation of a second required active power value, the second available reactive power value, wherein the second available apparent power value and the second required active power value are associated with the second group of inverters.

17. The utility-scale energy storage and conversion system of claim 14, wherein the total required reactive power value represents an amount of desired reactive power at the point of interconnect.

18. A method of operating a utility-scale energy storage and conversion system coupled to an electric network at a point of interconnect, the method comprising:

electrically coupling a first group of batteries having a first storage capacity to a first group of inverters having a first rating;

electrically coupling a second group of batteries having a second power storage capacity different from the first storage capacity to a second group of inverters having a second rating that is the same as the first rating;

combining outputs of the first group of inverters and the second group of inverters and supplying to the electric network at the point of interconnect; and distributing reactive power commands to the first and second groups of inverters to allocate reactive power proportional to corresponding available reactive powers of the first and second groups of inverters so as to utilize their corresponding ratings.

19. The method of claim 18, wherein distributing reactive power commands to the first and second groups of inverters to allocate reactive power proportional to corresponding available reactive powers of the first and second groups of inverters so as to utilize their corresponding ratings includes:

determining, using a representation of a first available reactive power value associated with the first group of inverters and a representation of a second available reactive power value associated with the second group of inverters, a representation of a total available reactive power;

generating, using the representation of the first available reactive power value and a representation of a total required reactive power value, a first control signal representing a first desired reactive power value proportional to the first available reactive power value; and generating, using the representation of the second available reactive power value and the total required reactive power value, a second control signal representing a second desired reactive power value proportional to the second available reactive power value.

20. The method of claim 18, comprising:

adjusting a terminal voltage associated with the first group of inverters and the second group of inverters in an electric network.

* * * * *